United States Patent
Butler et al.

(10) Patent No.: US 12,530,691 B2
(45) Date of Patent: *Jan. 20, 2026

(54) SYSTEMS AND METHODS FOR ARTIFICIAL INTELLIGENCE CONTROLLED PRIORITIZATION OF TRANSACTIONS

(71) Applicant: Capital One Services, LLC, McLean, VA (US)

(72) Inventors: Taurean Butler, Brookly, NY (US); Adam Vukich, Alexandria, VA (US); Abdelkader Benkreira, Washington, DC (US)

(73) Assignee: Capital One Services, LLC, Mclean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,575

(22) Filed: Feb. 1, 2024

(65) Prior Publication Data
US 2024/0378619 A1    Nov. 14, 2024

Related U.S. Application Data

(63) Continuation of application No. 16/907,668, filed on Jun. 22, 2020, now Pat. No. 11,922,426.

(51) Int. Cl.
*G06Q 20/40* (2012.01)
*G06N 3/049* (2023.01)
*G06Q 20/10* (2012.01)

(52) U.S. Cl.
CPC .......... *G06Q 20/405* (2013.01); *G06N 3/049* (2013.01); *G06Q 20/102* (2013.01); *G06Q 20/4037* (2013.01); *G06Q 20/4093* (2013.01)

(58) Field of Classification Search
CPC ............................................. G06Q 20/00–425
See application file for complete search history.

(56) References Cited

U.S. PATENT DOCUMENTS

| 7,676,408 | B2 | 3/2010 | Moebs et al. |
| 8,533,084 | B2 | 9/2013 | Moebs et al. |
| 8,533,222 | B2 * | 9/2013 | Breckenridge ........ G06N 20/00 707/777 |
| 8,560,447 | B1 | 10/2013 | Hinghole et al. |

(Continued)

FOREIGN PATENT DOCUMENTS

| CA | 2944853 | 4/2018 | |
| CA | 2944853 A1 * | 4/2018 | ........... G06Q 10/109 |

OTHER PUBLICATIONS

Taulli, Tom, Artificial Intelligence Basics: A Non-Technical Introduction. Apress, Berkeley, CA (2019) (Year: 2019).*

*Primary Examiner* — Chenyuh Kuo
(74) *Attorney, Agent, or Firm* — HUNTON ANDREWS KURTH LLP (57) ABSTRACT

Systems and methods for artificial intelligence transaction priority control are presented. Transaction priority control may be provided in the context of online user accounts maintained by financial institutions. Transaction priority control may be obtained through querying transaction information from a database, applying a predictive model to determine a likely future transaction, assigning a priority score to the future transaction, and approving or denying the future transaction based on the priority score.

18 Claims, 6 Drawing Sheets

System 100

(56) References Cited

U.S. PATENT DOCUMENTS

| | | |
|---|---|---|
| 8,661,038 B1 | 2/2014 | Whittam et al. |
| 8,712,887 B2 | 4/2014 | DeGroeve et al. |
| 8,768,832 B2 | 7/2014 | Cervenka |
| 8,799,163 B1 | 8/2014 | LeKachman |
| 10,043,166 B1* | 8/2018 | Kazenas ............... G06Q 20/102 |
| 10,572,727 B1 | 2/2020 | Sachtleben et al. |
| 10,977,635 B2* | 4/2021 | Storiale ................ G06Q 20/202 |
| 11,010,844 B2* | 5/2021 | Maheshwari .......... G06Q 50/01 |
| 11,270,312 B1* | 3/2022 | Jass .................... G06Q 30/0637 |
| 11,276,023 B1* | 3/2022 | Butler .................... G06N 20/00 |
| 11,861,574 B1* | 1/2024 | Bowers ............. G06Q 20/3221 |
| 11,922,426 B2* | 3/2024 | Butler .................... G06Q 20/405 |
| 2002/0042773 A1 | 4/2002 | Fugitte et al. |
| 2002/0116245 A1* | 8/2002 | Hinkle ................. G06Q 20/102 |
| | | 705/40 |
| 2005/0075969 A1 | 4/2005 | Nielson et al. |
| 2005/0125346 A1 | 6/2005 | Winiecki |
| 2006/0089848 A1 | 4/2006 | Townsend |
| 2006/0106687 A1 | 5/2006 | Lal et al. |
| 2007/0100749 A1* | 5/2007 | Bachu ................... G06Q 40/00 |
| | | 705/42 |
| 2007/0288360 A1 | 12/2007 | Seeklus |
| 2008/0195438 A1 | 8/2008 | Manfredi et al. |
| 2012/0278235 A1 | 11/2012 | Kitchel |
| 2012/0296804 A1 | 11/2012 | Stibel et al. |
| 2014/0012639 A1 | 1/2014 | Dintenfass |
| 2014/0324686 A1 | 10/2014 | Dewan |
| 2014/0358776 A1 | 12/2014 | Xu et al. |
| 2015/0046304 A1 | 2/2015 | Bondesen et al. |
| 2015/0379415 A1 | 12/2015 | Fondekar et al. |
| 2016/0180452 A1* | 6/2016 | Caldwell ............. G06Q 20/227 |
| | | 705/35 |
| 2016/0225077 A1 | 8/2016 | Tillman et al. |
| 2017/0124653 A1 | 5/2017 | Dunkin et al. |
| 2017/0132520 A1* | 5/2017 | Burroughs ............... G06N 7/01 |
| 2017/0278185 A1 | 9/2017 | Veal, IV |
| 2017/0316475 A1 | 11/2017 | Shanmugam et al. |
| 2019/0073647 A1 | 3/2019 | Zoldi et al. |
| 2019/0259095 A1* | 8/2019 | Templeton ............... G06N 3/08 |
| 2020/0380528 A1* | 12/2020 | Ganapathy ........... G06Q 20/405 |

* cited by examiner

SYSTEMS AND METHODS FOR ARTIFICIAL INTELLIGENCE CONTROLLED PRIORITIZATION OF TRANSACTIONS

CROSS-REFERENCE TO RELATED APPLICATION

This application is a continuation of U.S. patent application Ser. No. 16/907,668 filed Jun. 22, 2020, the complete disclosure of which is incorporated herein by reference in its entirety.

FIELD OF THE DISCLOSURE

The present disclosure relates generally to artificial intelligence (AI) technology and, more specifically, to an exemplary AI system and method for controlled prioritization of transactions.

BACKGROUND

Bill pay systems linked to user accounts at financial institutions, such as banks, provide users with a convenient way to pay bills. When provided via online account access, bill pay systems allow users to pay bills electronically without having to write out physical checks and mail the checks to vendors, creditors or other payees. Some bill pay systems allow users to schedule payment of bills in advance.

However, the ability to schedule payment of bills in advance can result in a lack funds available to cover the payment at the time it become due. For example, a user may forget about a scheduled payment and pay another bill, or neglect to add sufficient funds to cover the payment. As a result, the payee, the financial institution, and/or the user may suffer losses or other inconveniences when there are insufficient funds in the user's account to cover the payment.

Thus, it may be beneficial to provide exemplary systems and methods which allow financial systems and users to prioritize transactions to overcome at least the deficiencies described herein.

SUMMARY

Aspects of the disclosed technology include AI-based systems and methods for controlled prioritizing of transactions. Transaction priority control may be provided in the context of transactional accounts maintained by financial institutions via applying a predictive model to determine a likely future transaction, assigning a priority score to the future transaction, and approving or denying the future transaction based on the priority score. In this way, higher priority transactions may be approved, and lower priority transactions may be denied (or effectively deferred) until higher priority transactions are completed or an account balance is sufficiently increased. This provides an advantage over current systems that attempt to complete transactions according to scheduling instructions without taking into consideration the priority of the transaction.

Embodiments of the present disclosure provide a transaction priority control system, comprising: an account database containing transaction information for an account associated with a user, the transaction information including one or more transactions associated with the account and a balance associated with the account; and a server configured for data communication with the account database, the server comprising a prioritization engine and a transaction approval engine; wherein, the prioritization engine is configured to: determine if the account balance is less than a first predetermined amount; upon determining that the account balance is less than the first predetermined amount: query transaction information from the account database; apply a predictive model to the transaction information to determine a future transaction that is likely to occur within a predetermined time period and to determine a future balance associated with the future transaction; assign a priority score to the future transaction, upon determining that the future balance associated with the future transaction is less than a second predetermined amount; and send the future transaction and the priority score associated with the future transaction to the transaction approval engine; and wherein, transaction approval engine is configured to: receive the future transaction and the priority score associated with the future transaction from the prioritization engine; approve or deny the future transaction based on the priority score; and send a notification message to the user regarding the decision to approve or deny the future transaction.

Embodiments of the present disclosure provide a method for transaction priority control, comprising: receiving funds from a user, thereby establishing an account balance associated with a user account; recording transactions associated with the user account; determining if the account balance is less than a first predetermined amount; applying a predictive model to the recorded transactions to determine a future transaction that is likely to occur within a predetermined time period after the determining that the account balance is less than the first predetermined amount; assigning a priority score to the future transaction; approving or denying the future transaction based on the assigned priority score; and sending a notification message to the user regarding the approval decision.

Embodiments of the present disclosure provide An artificial intelligence system, comprising: a database containing transaction information associated with a user account, wherein the transaction information includes one or more of a transaction amount, account balance, transaction date, merchant name, and merchant category; a user interface; a prioritization engine comprising a processor and configured for data communication with the database; and a transaction approval engine configured for data communication with the prioritization engine and with the user interface; wherein the prioritization engine is further configured to: receive transaction information from the database; apply a predictive model to the transaction information to detect a likely future transaction; determine a future account balance associated with the future transaction; assign a priority score to the future transaction; send the future transaction and the priority score to a transaction approval engine; monitor transaction information to determine the accuracy of the predictive model; and adjust the predictive model in response to the determined accuracy; and wherein the transaction approval engine is further configured to: receive the future transaction and the priority score from the prioritization engine; approve or deny the future transaction based on the priority score; and send a notification message to the user interface regarding the decision to approve or deny the future transaction.

Further features of the disclosed design, and the advantages offered thereby, are explained in greater detail hereinafter with reference to specific example embodiments described below and illustrated in the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The present disclosure provides systems, methods, and devices for developing and utilizing AI systems, an AI engine, machine learning techniques, and predictive modeling facilitating transaction priority control. Exemplary embodiments of the disclosed systems and methods provide for transaction priority control through querying transaction information from a database, applying a predictive model to determine a likely future transaction, assigning a priority score to the future transaction, and approving or denying the future transaction based on the priority score. Benefits of the disclosed technology may include improved user experience and improved fraud prevention. Further benefits may include the avoidance of overdraft processing, overdraft fees, and detrimental credit score impacts due to late or missed payments.

Transaction priority control may be provided in the context of online user accounts maintained by financial institutions, such as, e.g., banks or credit unions. Many financial institutions maintain user accounts, such as, e.g., checking accounts, savings accounts, etc. that provide transactional services, such as, e.g., allowing users to write checks or issue instructions for electronic funds transfer (EFT) to effect a transfer of money in payment of goods and services. Online banking services provided by financial institutions allow users to carry out these types of transactions online. For example, a user may, with a user computer, connect via the Internet to a server operated by a bank and, by interacting with the bank's web site, access the user's account online and issue instructions to make a payment from the user's account to another party. Many online banking services include a bill pay service, which allows users to receive and view bills from vendors or service providers electronically and issue instructions for payment of those bills. Other bill pay services are provided by independent parties and may be linked to a user's account for handling payments.

Some bill pay systems incorporate a scheduling feature for payments, such that a user may schedule payment of a bill in advance of the date at which the bill would be paid from the user's account. But the ability to schedule payment of bills in advance can lead to problems. For example, when a bill is scheduled for payment in the future, there may be adequate funds in the account to cover the payment at the time the payment is added to the schedule. If the account balance drops before the date of payment, there is an increased risk of insufficient funds being available to cover the payment at the time the payment is to be deducted from the user's account (which may be before, at the same time, or after the financial institution actually sends the payment to the payee). Low account balances may occur for a number of reasons, including, e.g., other payments being made from the account, or failure (whether by mistake, negligence or intent) to add funds to the account. Embodiments of the transaction priority control system described herein address these and other problems with online bill payment systems.

Figure 1A:
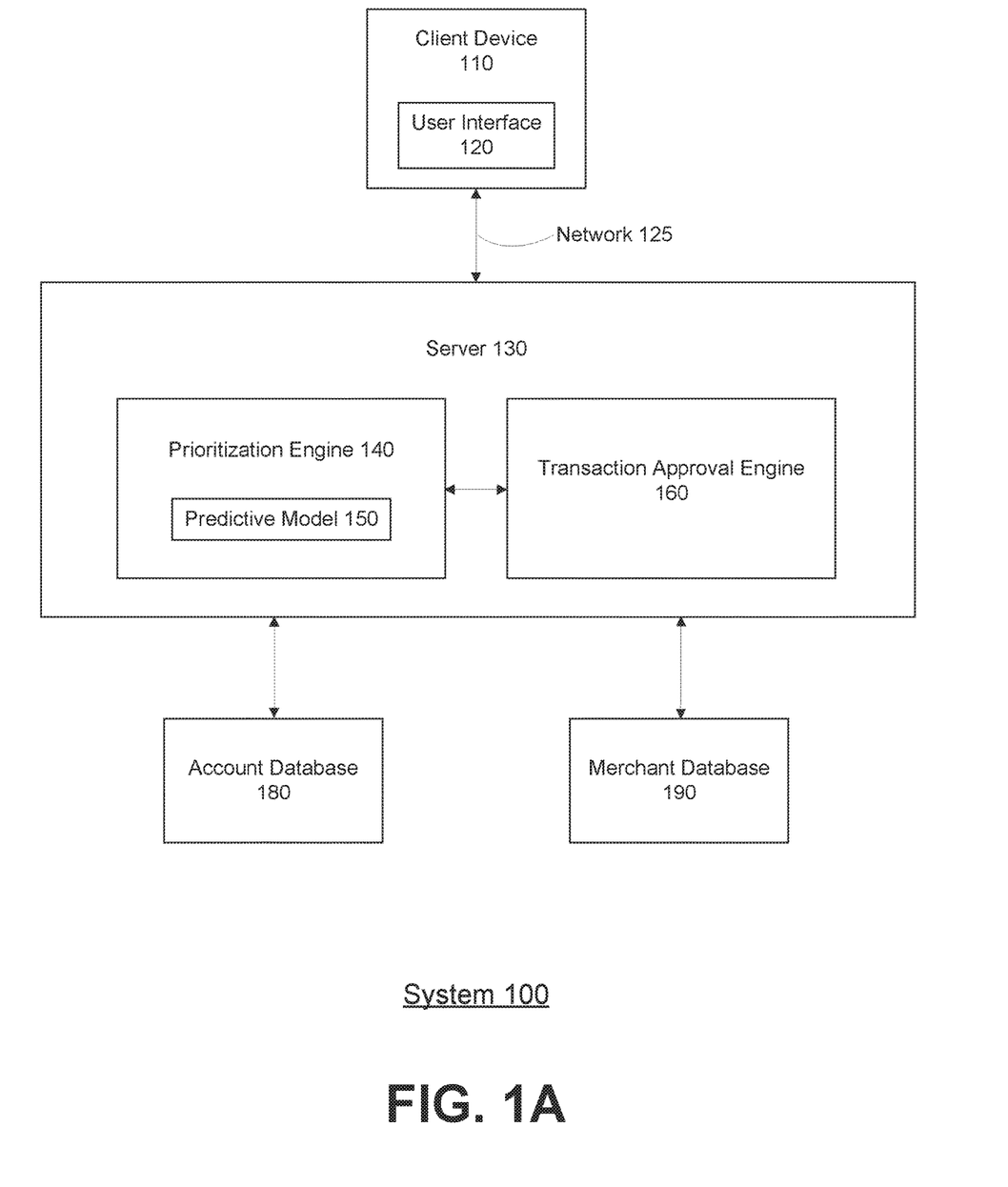
FIG. 1A-1B provide diagrams of a transaction priority control system according to one or more example embodiments.
Figure 1B:
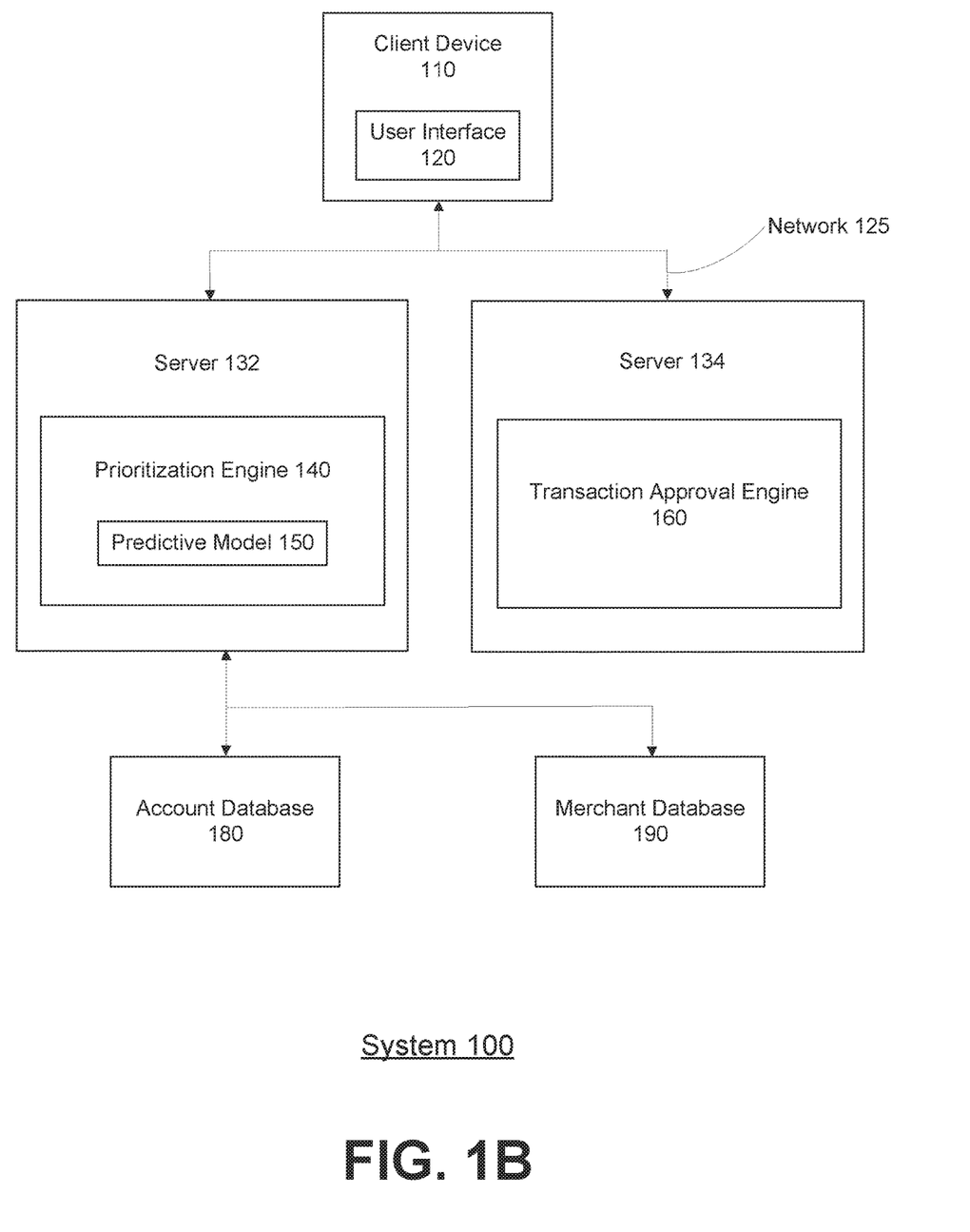

FIGS. 1A and 1B illustrate a transaction priority control system 100 according to one or more example embodiments. FIGS. 1A and 1B depict similar components with a differing server configuration. It is understood that not all embodiments include every component shown in FIG. 1A or FIG. 1B. It is also understood that embodiments may contain additional or multiple components connected in various ways via one or more communication paths or networks to form a variety of system configurations.

As shown in FIG. 1A, system 100 may include client device 110, server 130, account database 180, and merchant database 190. Similarly, as shown in FIG. 1B, system 100 may include a client device 110, server 132, server 134, account database 180, and merchant database 190.

Client device 110 may include a user interface 120. Client device 110 may be configured for data communication via network 125 with server 130 (FIG. 1A), server 132 and server 134 (FIG. 1B) and/or other devices. Client device 110 may be a network-enabled computer. As referred to herein, a network-enabled computer may include, but is not limited to, a computer device, or communications device including, e.g., a server, a network appliance, a personal computer, a workstation, a laptop, a phone, a handheld PC, a personal digital assistant, a thin client, a fat client, an Internet browser, or other device. Client device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. Client device 110 may include user interface 120.

Client device 110 may also include a display (not shown). Such display may be any type of device for presenting visual information such as a computer monitor, a flat panel display, or a mobile device screen, including liquid crystal displays, light-emitting diode displays, plasma panels, and cathode ray tube displays.

Client device 110 may also include one or more device inputs (not shown). Such inputs may include any device for entering information into the client device that is available and supported by the client device 110, such as a touch-screen, keyboard, mouse, cursor-control device, touch-screen, microphone, digital camera, video recorder, or camcorder. The device inputs may be used to enter information and interact with the client device 110 and, by extension, with the systems described herein.

Client device 110 may also include memory (not shown) that may include read-only memory, write-once read-multiple memory and/or read/write memory, e.g., RAM, ROM, and EEPROM, including any combination thereof, and may store executable instructions and/or data, as may be necessary or appropriate to control, operate or interface with the other features of client device 110, including any applications running on client device 110.

Client device 110 may also include a communications interface (not shown) that may include wired or wireless data communication capability. These capabilities may support data communication with network 125 and/or any wired or wireless communication network. Communications between client device 110 and other devices may be encrypted or decrypted using any suitable cryptographic method.

User interface 120 may include one or more applications executing on client device 110 that facilitate input and/or display of information, data or commands, and may work in concert with device input(s) and/or display(s) of client device 110. User interface 120 may include or be provided by an operating system executing on client device 110, and may include an application such as an Internet browser executing on client device 110. User interface 120 may include application or browser code (such as, e.g., Java or HTML code) transmitted by a server (such as server 130) or other device in communication with client device 110.

Network 125 may include one or more of a wireless network, a wired network or any combination of wireless network and wired network, and may be configured to connect, for purposes of data communication, one or more devices in system 100. For example, network 125 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 125 may include, without limitation, telephone lines, fiber optics, IEEE Ethernet 902.3, a wide area network, a wireless personal area network, a LAN, or a global network such as the Internet. In addition, network 125 may support an Internet network, a wireless communication network, a cellular network, or the like, or any combination thereof. Network 125 may further include one network, or any number of the exemplary types of networks mentioned above, operating as a stand-alone network or in cooperation with each other. Network 125 may utilize one or more protocols of one or more network elements to which they are communicatively coupled. Network 125 may translate to or from other protocols to one or more protocols of network devices. Although network 125 is depicted as a single network, it should be appreciated that according to one or more example embodiments, network 125 may comprise a plurality of interconnected networks, such as, for example, the Internet, a service provider's network, a cable television network, corporate networks, such as credit card association networks, a LAN, and/or home networks.

Communication between devices may include any methods used for data communication over a network, including, for example, a text message, an e-mail, or other messaging techniques appropriate in a network-based configuration. Communication methods may include an actionable push notification with an application stored on client device 110.

System 100 may include one or more servers 130 (shown in FIG. 1A) and/or servers 132 and 134 (shown in FIG. 1B).

Each of server 130, server 132 and server 134 may include one or more processors such as, e.g., a microprocessor, RISC processor, ASIC, etc., along with associated processing circuitry, which are coupled to memory storing executable instructions and/or data. Each of server 130, server 132 and server 134 may be configured as a central system, server or platform to control and call various data at different times to execute a plurality of workflow actions. Each of server 130, server 132 and server 134 may be a dedicated server computer, such as bladed servers, or may be one or more personal computers, laptop computers, notebook computers, palm top computers, network computers, mobile devices, or any processor-controlled device capable of supporting the features of server 130, server 132 and server 134 as described herein. Each of server 130, server 132 and server 134 may include one or more software applications or executable program code to be executed on a processor and configured to carry out features described herein for such server. Memory included in server 130, server 132 or server 134 may include read-only memory, write-once read-multiple memory and/or read/write memory, e.g., RAM, ROM, and EEPROM, including any combination thereof, and may store executable instructions and/or data, as may be necessary or appropriate to control, operate or interface with the other features of server 130, server 132 or server 134, including any applications running on server 130, server 132 or server 134.

Each of server 130, server 132 and server 134 may be configured for data communication with client device 110 and/or other devices via a network such as network 125. Each of server 130, server 132 and server 134 may communicate, send or receive messages, requests, notifications, data, etc. to/from other devices, such as client device 110. Each of server 130, server 132 and server 134 may also include a communications interface (not shown) that may include wired or wireless data communication capability. These capabilities may support data communication with network 125 and/or any wired or wireless communication network. Communications between server 130, server 132 or server 134 and other devices may be encrypted or decrypted using any suitable cryptographic method.

Connections between server 130 (FIG. 1A) or server 132 (FIG. 1B) and account database 180 and/or merchant database 190 may be made via any communications line, link or network, or combination thereof, wired and/or wireless, suitable for communicating between these components. Such network may include network 125 and/or one or more networks of same or similar type as those described herein with reference to network 125. In some example embodiments, connections between these devices may include a corporate LAN. Similarly, connections between server 132 and server 134 (FIG. 1B) may be made via any communications line, link or network, or combination thereof, wired and/or wireless, suitable for communicating between these components. Such network may include network 125 and/or one or more networks of same or similar type as those described herein with reference to network 125. In some example embodiments, connections between server 132 and server 134 may include a corporate LAN.

In some embodiments, as shown in FIG. 1A, server 130 may include prioritization engine 140 and transaction approval engine 160. In some embodiments, as shown in FIG. 1B, server 132 may include prioritization engine 140 and server 134 may include transaction approval engine 160. Other configurations involving prioritization engine 140 and transaction approval engine 160 may include one or both units comprising or operating on one or more computers (each of which may be a server) and connecting to one or more separate servers.

Prioritization engine 140 may be an artificial intelligence engine for prioritizing transactions and may apply a predictive model 150. Prioritization engine 140 may include application software for executing on a processor (such as in server 130 or server 132), and be configured to carry out some or all of the features described herein. In some embodiments, prioritization engine 140 may include a processor such as, e.g., a microprocessor, RISC processor, ASIC, etc., along with associated processing circuitry, which are coupled to memory storing executable instructions (such as the application software) and/or data.

Prioritization engine 140 may be in data communication with client device 110, user interface 120, transaction approval engine 160, account database 180, and/or merchant database 190, and may be configured to receive information or data relating to user information, including user preferences, user accounts, and user transactions, and merchant information, including merchant account balances, payment schedules and late fee information. Prioritization engine 140 may be configured to carry out features of system 100, including: querying a user's account balance and determine if the user's account balance is less than a first predetermined amount, applying a predictive model to user transaction information to determine a future transaction likely to occur within a predetermined time period and to determine a future balance for the user's account associated with the future transaction, determining whether the future balance is less than a second predetermined amount, assigning a priority score to the future transaction, and transmitting the priority score associated with the future transaction to transaction approval engine 160. Prioritization engine 140 may also be configured to receive user preference information and apply the user preference information in assigning a priority score to the future transaction. Additional details and features regarding prioritization engine 140 are further described below with reference to FIGS. 2A and 2B.

Predictive model 150 may be a supervised learning model with predictor variables. The predictor variables of the model may be selected from the data stored in account database 180 and/or merchant database 190, or any other available data associated with user transactions and accounts. In some embodiments, the predictor variables may be a subset of the available information; the subset of data used may increase, may decrease, or may otherwise be modified over time as the development of the predictive model continues. Predictive model 150 may include continuous learning capabilities that allow the model to adjust itself or its determinations as more information and data becomes available.

Predictive model 150 may be developed by machine learning algorithms. In some embodiments, the machine learning algorithms employed may include gradient boosting, logistic regression, recurrent neural networks, convolutional neural networks, one-hot encoding, learned embedding, or a combination thereof; however, it is understood that other machine learning algorithms may be utilized. In some embodiments, the predictive model may be developed and trained using historical data associated with user transactions and accounts. In some embodiments, the historical data associated with user transactions and accounts may include data associated with a plurality of users, or may be from a category or sub-category of users (e.g., users sharing a particular profession, users having a particular range of income, or users who are high spenders). In some embodiments, transactions associated with one or more accounts may be monitored over time to determine the accuracy of the predictive model, e.g. in determining future transactions and future account balances, which may be used for revising the predictive model.

The machine learning may utilize information from historical data to make the determination, and various exemplary models may be generated for prediction. The machine learning may then apply the generated models to predict future transactions and future account balances.

Various neural networks, such as convolutional neural networks ("CNN") or recurrent neural networks ("RNN") to generate the predictive model. A CNN may include one or more convolutional layers (e.g., often with a subsampling step) and then followed by one or more fully connected layers as in a standard multilayer neural network. CNNS may utilize local connections, and may have tied weights followed by some form of pooling which may result in translation invariant features.

A RNN is a class of artificial neural network where connections between nodes form a directed graph along a sequence. This facilitates the determination of temporal dynamic behavior for a time sequence. Unlike feedforward neural networks, RNNs may use their internal state (e.g., memory) to process sequences of inputs. A RNN may generally refer to two broad classes of networks with a similar general structure, where one is finite impulse and the other is infinite impulse. Both classes of networks exhibit temporal dynamic behavior. A finite impulse recurrent network may be, or may include, a directed acyclic graph that may be unrolled and replaced with a strictly feedforward neural network, while an infinite impulse recurrent network may be, or may include, a directed cyclic graph that may not be unrolled. Both finite impulse and infinite impulse recurrent networks may have additional stored state, and the storage may be under the direct control of the neural network. The storage may also be replaced by another network or graph, which may incorporate time delays or may have feedback loops. Such controlled states may be referred to as gated state or gated memory, and may be part of long short-term memory networks ("LSTMs") and gated recurrent units RNNs may be similar to a network of neuron-like nodes organized into successive "layers," each node in a given layer being connected with a directed e.g., (one-way) connection to every other node in the next successive layer. Each node (e.g., neuron) may have a time-varying real-valued activation. Each connection (e.g., synapse) may have a modifiable real-valued weight. Nodes may either be (i) input nodes (e.g., receiving data from outside the network), (ii) output nodes (e.g., yielding results), or (iii) hidden nodes (e.g., that may modify the data en route from input to output). RNNs may accept an input vector x and give an output vector y. However, the output vectors are based not only by the input just provided in, but also on the entire history of inputs that have been provided in in the past.

For supervised learning in discrete time settings, sequences of real-valued input vectors may arrive at the input nodes, one vector at a time. At any given time step, each non-input unit may compute its current activation (e.g., result) as a nonlinear function of the weighted sum of the activations of all units that connect to it. Supervisor-given target activations may be supplied for some output units at certain time steps. For example, if the input sequence is a speech signal corresponding to a spoken digit, the final target output at the end of the sequence may be a label classifying the digit. In reinforcement learning settings, no teacher provides target signals. Instead, a fitness function, or reward function, may be used to evaluate the RNNs performance, which may influence its input stream through output units connected to actuators that may affect the environment. Each sequence may produce an error as the sum of the deviations of all target signals from the corresponding activations computed by the network. For a training set of numerous sequences, the total error may be the sum of the errors of all individual sequences.

Transaction approval engine 160 may be an artificial intelligence engine for approving or denying transactions. Transaction approval engine 160 may include application software for executing on a processor (such as in server 130 or server 134), and be configured to carry out some or all of the features described herein. In some embodiments, transaction approval engine 160 may include a processor such as, e.g., a microprocessor, RISC processor, ASIC, etc., along with associated processing circuitry, which are coupled to memory storing executable instructions (such as the application software) and/or data.

Transaction approval engine 160 may be in data communication with client device 110, user interface 120, and/or prioritization engine 140, and may be configured to receive information or data relating to user information, including user preferences and user transactions. Transaction approval engine 160 may be configured to carry out features of system 100, including: receiving a priority score associated with a future transaction from prioritization engine 140, determining whether to approve or deny the future transaction based on the priority score, and notifying the user about the approval decision. Transaction approval engine 160 may also be configured to receive user preference information and apply the user preference information in determining whether to approve or deny the future transaction. Additional details and features regarding transaction approval engine 160 are further described below with reference to FIGS. 3A and 3B.

Account database 180 and/or merchant database 190 may be, or may be run on, dedicated server computers, such as bladed servers, or may be personal computers, laptop computers, notebook computers, palm top computers, network computers, mobile devices, or any processor-controlled device capable of supporting system 100. Account database 180 and/or merchant database 190 may each include memory, application software and a processor configured to carry out some or all of the features described herein. Account database 180 and/or merchant database 190 may each be a relational or non-relational database, or a combination of more than one database. In some embodiments, database 180 and/or database 190 may be physically separate and/or remote from other components of system 100, located in another server, on a cloud-based platform, or in any storage device that is in data communication with server 130 or server 132. In some embodiments, server 130, server 132 or server 134 may incorporate database 180 and/or database 190. Data stored in database 180 and/or database 190 may be stored in any suitable format, and may be encrypted and stored in a secure format to prevent unauthorized access. Any suitable algorithm/procedure may be used for data encryption and for authorized decryption.

Account database 180 may contain data relating to one or more user accounts. User accounts may be maintained by (or on behalf of) and/or relate to any one or more of a variety of entities, such as, for example a bank, a credit union, or other financial institution. For example, database 180 may include, without limitation, account identification information (e.g., account number, account owner identification number, account owner name and contact information), account characteristics (e.g., type of account, such as checking; funding and transaction limitations, and restrictions on access and other activity), and may include data pertinent to the account, including, e.g., balance information, deposit history (including recurring deposits), and transaction history (including recurring payments). Account database 180 may also include detailed information about individual transactions, including, e.g., payee, amount, date, category, method of payment, and payment notes or metadata that may describe the purpose of payment (e.g. a memo on funds transfers or checks). Transaction category may identify the nature of the transaction, such as, e.g., a mortgage payment, utility payment (e.g., electric or gas company), car payment, cell phone payment, cable television payment, credit card payment, etc. Individual transactions may include historic transactions, recurring transactions (e.g., monthly mortgage, car payments, or subscriptions, including amounts and due dates), one-off transactions, and transactions yet to be paid (e.g., recently-received bills, including amounts and due dates). An account balance for a user's account may be established, e.g., by a user depositing funds into the account, or the user setting up direct paycheck deposits, etc. Transaction information may include adding transactions carried out via a user's account over time, including deposits, withdrawals, checks drawn on the account, electronic funds transactions, etc.

Merchant database 190 may contain data relating to one or more entities, such as retailer, utility service provider, communications service provider, manufacturer, provider or promoter of sporting or entertainment events, hotel chain, or any other provider of goods or services. Data in merchant database 190 may include merchant name, location, category, account balances, payment schedules and information regarding late fees (e.g., fees charged for late payments made by a user to a merchant account having an outstanding balance).

It will be understood that some embodiments of system 100 may use multiple computer systems, servers and/or processors as necessary or desired to support users and may also use back-up or redundant servers to prevent network downtime in the event of a failure of a particular server. It is further understood that in some embodiments, a plurality of additional databases may store information and/or data utilized by system 100.

Figure 2A:
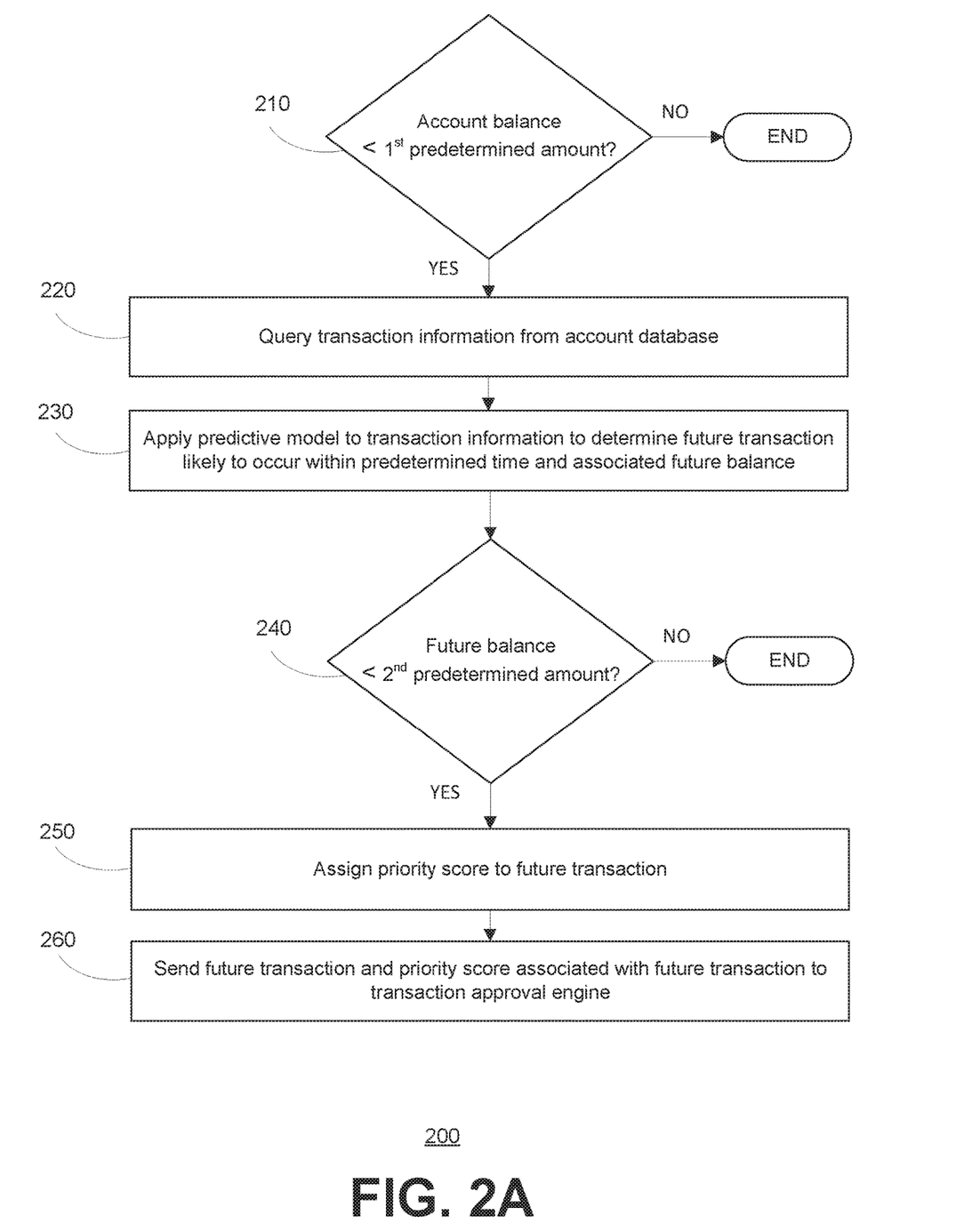
FIGS. 2A-2B provide flowcharts illustrating one or more methods of transaction priority control according to one or more example embodiments.
Figure 2B:
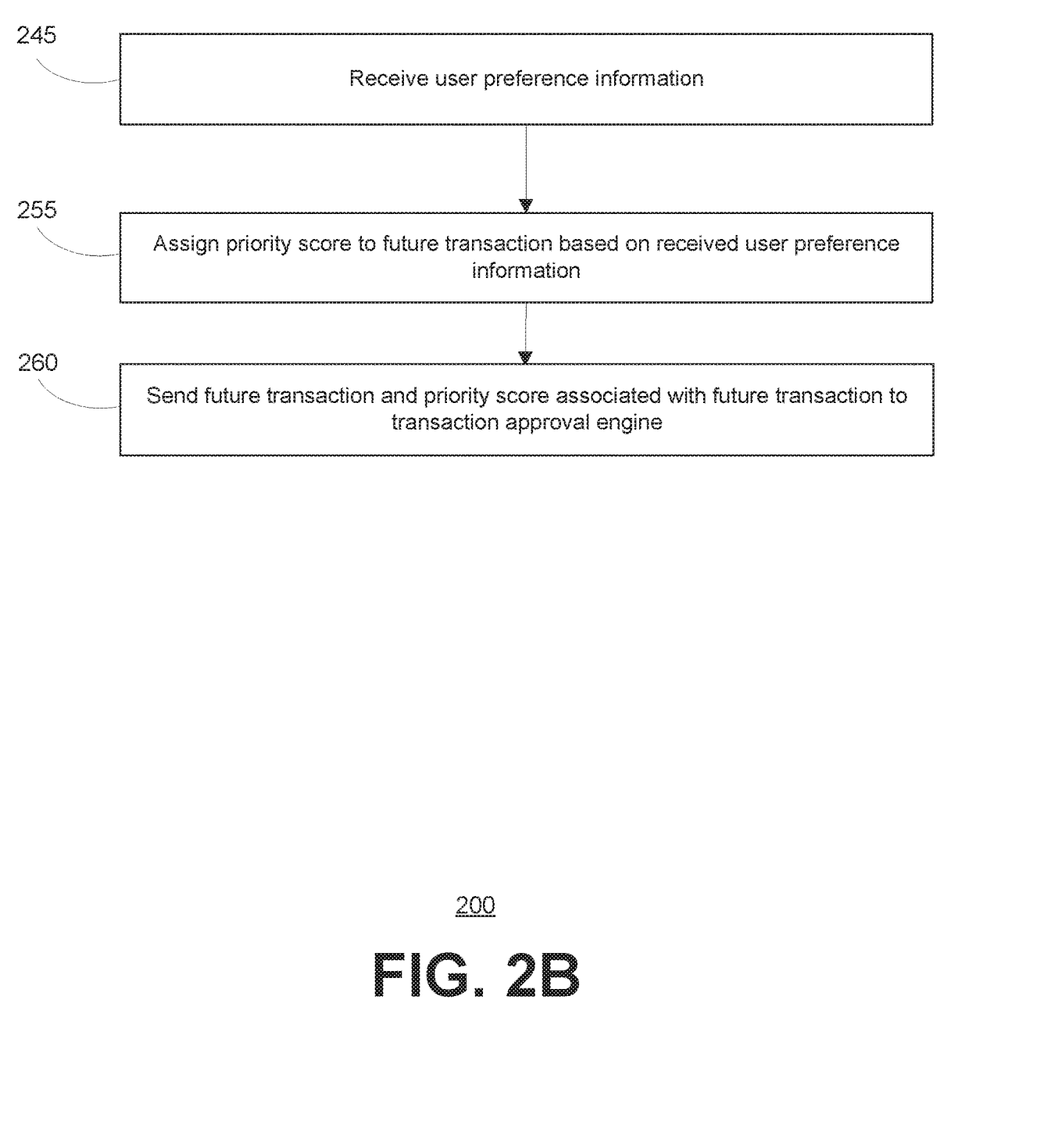

FIGS. 2A and 2B are flowcharts illustrating one or more methods of transaction priority control according to one or more example embodiments, with reference to components and features described above including but not limited to the figures and associated description. Transaction priority control method 200 may be carried out by prioritization engine 140 having access to user account information from account database 180 and merchant information from merchant database 190.

At block 210, a user's account balance may be queried, and the user's account balance may be compared to a first predetermined amount. The first predetermined amount may be based on one or more factors such as an historic average account balance or an average balance over a predetermined time period (such as, e.g., a 3-month period), or an estimate of funds as required to pay all expected bills due within a time period (such as, e.g., within the next 30 days), and may be adjusted over time. If the result of the comparison is that the account balance is greater than the first predetermined amount ("NO" path in FIG. 2A at block 210), no further action may need to be taken at that time. If the result of the comparison is that the account balance is less than the first predetermined amount ("YES" path in FIG. 2A at block 210), however, this indicates that there may be risk of insufficient funding in the account, and the process may continue as described below.

At block 220, the account database may be queried to obtain information about the user's transactions, which may include information about recurring transactions or any information available in account database 180.

At block 230, the predictive model of the prioritization engine may be applied to determine a future transaction or a plurality of future transactions likely to occur within a predetermined time period, and to determine a future account balance associated with the future transaction. The predetermined time period may be, e.g., a week, a month, a specific day of the week or month, and may be set according to user preferences. The predetermined time period may be based on the user's history of funding the user's account.

One or more future transactions may be identified by evaluating historical transactions. For example, if a transaction occurs at a particular periodic interval (e.g., every month on the 15th of the month), it may be predicted that the transaction will also occur at the next interval (e.g., on the 15th of the next month). A future account balance may be determined by adding all of the predicted account credits (e.g., deposited paychecks) and subtracting the predicted account debits (e.g., recurring bills, average withdrawals for dining and entertainment).

In some examples, future transactions may be identified based on at least one selected from the group of the creditor/debitor identity, the recurrence periodicity, and the transaction amount. For example, if an account receives a credit twice per month on the 15th and last days of the month in approximately the same amount from the same entity, it may be predicted that this is a deposited paycheck and that the account user is paid twice a month. In addition, the method of deposit would be known (e.g., whether it is a manual check deposit or an electronic direct deposit). Similarly, the manner of withdrawals would be known (e.g., cash withdrawals via automated teller machines, written checks that have been cashed, credit card charges, electronic account payments for utilities or other bills).

In some examples, future transactions may be predicted based on pre-authorization charges, where an account is charged or debited a nominal amount (e.g., $0.01, $1.00, $10.00) in advance of the actual transaction. Pre-authorizations may be performed for a number of reasons including, for example, to determine whether an account is valid and functional. A pending pre-authorization charge may be performed by in advance of an actual transaction by the merchant that will perform the transaction and apply a charge or debit to the account for the transaction. The merchant may be identified by the pre-authorization charge and a prediction can be based on this identification. Additionally, the prediction may be based on information associated with the merchant (e.g., the merchant's known prior transactions, the account's transaction history, etc.).

In some examples, the future transaction amount may be predicted by transaction patterns and aggregate transaction history data. For example, if the account is completing a promotional rate on a recurring transactions (e.g., with a cable television company or other utility), aggregate transaction data may be used to determine the future transaction amount. As another example, the prediction may be refined by identifying patterns within specific geographic areas, such as zip codes, city limits, counties, states, or geographic distances (e.g., 5 miles, 20 miles, 100 miles).

At block 240, the future account balance may be compared to a second predetermined amount. The second predetermined amount may be based on the actual current balance of the account plus the predicted credits and minus the predicted debits, and may be adjusted over time. If the result of the comparison is that the future account balance is greater than the second predetermined amount ("NO" path in FIG. 2A at block 240), no further action may need to be taken at that time. If the result of the comparison is that the future account balance is less than the second predetermined amount ("YES" path in FIG. 2A at block 240), however, this indicates that there may be additional risk of insufficient funding in the account at the time of the future transaction, and the process may continue on as described below.

At block 250, a priority score may be determined and assigned to the future transaction. The priority score may be based on a number of factors, including the category of the transaction, account history, user preference information, and method of payment. For example, a future mortgage payment may be considered more important than other transactions of different categories (e.g., a credit card payment) and, thus, may be assigned a higher priority score. As another example, a recurring payment (e.g., a recurring utility payment) may be considered more important than a one-time charge (e.g., for an online purchase) and may be assigned a higher priority score.

In some examples, the priority score may be determined based on a user input for ranking, such that a user may rank mortgage and utility payments above a credit card payment for a period of time based on user preferences, financial priorities, or other decision-making. The user input can also set a time period during which the ranking to be effective and after which the ranking can expire. For example, the user may provide a ranking that assigns a lower priority score to credit card payments in order to take advantage of a temporary zero interest credit card promotion but specify (or manually repeal) the rankings once the promotion ends.

In other examples, the ranking can appropriate prioritize user needs versus user wants by evaluating the nature of the transaction. For example, a mortgage payment may be assigned a higher ranking than a subscription to a video streaming service.

In other examples, past activity may be factored into priority scores. For example, if the transaction has deferred once before, the prioritization may be higher. A transaction may be deferred for a number of reasons, such as due to lack of funds and/or a low priority score. However, there may be situations where multiple deferrals are undesirable. For example, one missed utility payment may not result in the utility being shut off, but multiple missed payments may increase the chances that the utility is shut off. Accordingly, the priority score assigned to a previously-deferred transaction may be higher than if the transaction had not been previously deferred. This consideration may be bounded by deferrals within a previous time period (e.g., deferrals within the past six months, past year, or past five years). This consideration may also place more priority on recent deferrals versus older deferrals.

In some examples, priority scores may be applied to merchants on an individual basis. In other examples, priority scores may be applied to merchant categories, such as utilities, dining/entertainment, travel, lenders (e.g., credit card or mortgage lenders). The use of merchant categories may improve the efficiency of generating and applying priority scores, and the accuracy of applying priority scores to merchants falling within one or more categories. In contrast, the use of priority scores on an individual basis may provide more accurate and detailed scoring for individual merchants.

At block 260, the future transaction and the priority score associated with the future transaction may be sent to the transaction approval engine for a determination whether to approve or deny the future transaction. In some examples, the future transactions can be sent to the transaction engine singly or as a batch of multiple future transactions. In examples where prioritization is required, batching multiple transactions may improve performance, however, it is understood that batching is not necessary for effective prioritization.

In some embodiments, the sequence may follow blocks 210 through 240 as shown in FIG. 2A and then proceed as shown in FIG. 2B. According to the flow diagram in FIG. 2B, block 250 (referenced in FIG. 2A) is not carried out in the sequence shown in FIG. 2A. Instead, with reference to FIG. 2B, after the sequence of blocks 210 through 240 are carried out (as in FIG. 2A), if the result of block 240 leads to the "YES" path (in FIG. 2A at block 240), the sequence continues in FIG. 2B with block 245.

At block 245 user preference information may be received from the user interface, or from another source.

At block 255, a priority score may be determined and assigned to the future transaction. The priority score may be based on a number of factors, including the category of the transaction, account history, method of payment, and the user preference information. For example, user preference information provided by a first user may prioritize paying an electricity bill higher than a car payment, because the first user values home comfort higher than driving. However, user preference information provided by a second user may prioritize a car payment higher than an electricity bill, because the second user is a driver for a ridesharing company, such that the car provides a needed source of income. In some examples, user preference information may override other priority scores or default priority scoring.

At block 260, the future transaction and the priority score associated with the future transaction may be sent to the transaction approval engine for a determination whether to approve or deny the future transaction (same as shown in FIG. 2A).

In some embodiments, prioritization engine 140 may receive merchant information from merchant database 190. Merchant information may include late fee information. The priority score (described above with reference to blocks 250 and 255) associated with a future transaction may be determined and assigned to the future transaction based in part on merchant information as well as on other factors.

In some embodiments, prioritization engine 140 may send a low balance notification to the user, warning the user that the account balance is low and may be insufficient to cover a future transaction, if the result of the comparison at block 240 is that the future account balance is less than the second predetermined amount. In some embodiments, the low balance notification may be sent a predetermined time prior to denial of the future transaction. The low balance notification may be sent to the user via any appropriate messaging technique, including e-mail, text message, push notification, etc.

Figure 3A:
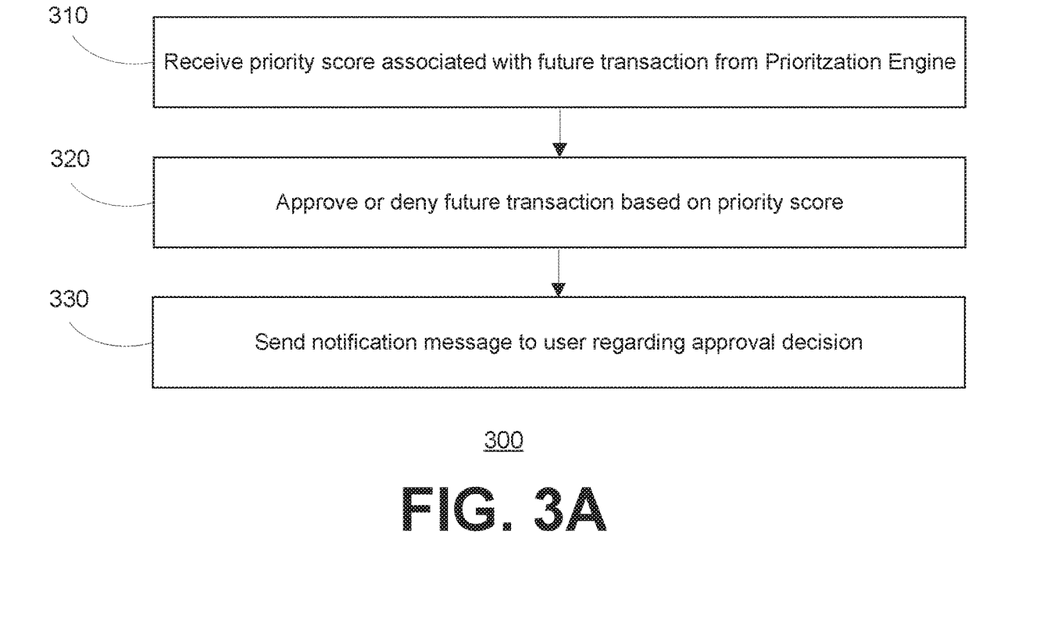
FIGS. 3A-3B provide flowcharts illustrating one or more methods of transaction priority control according to one or more example embodiments.
Figure 3B:
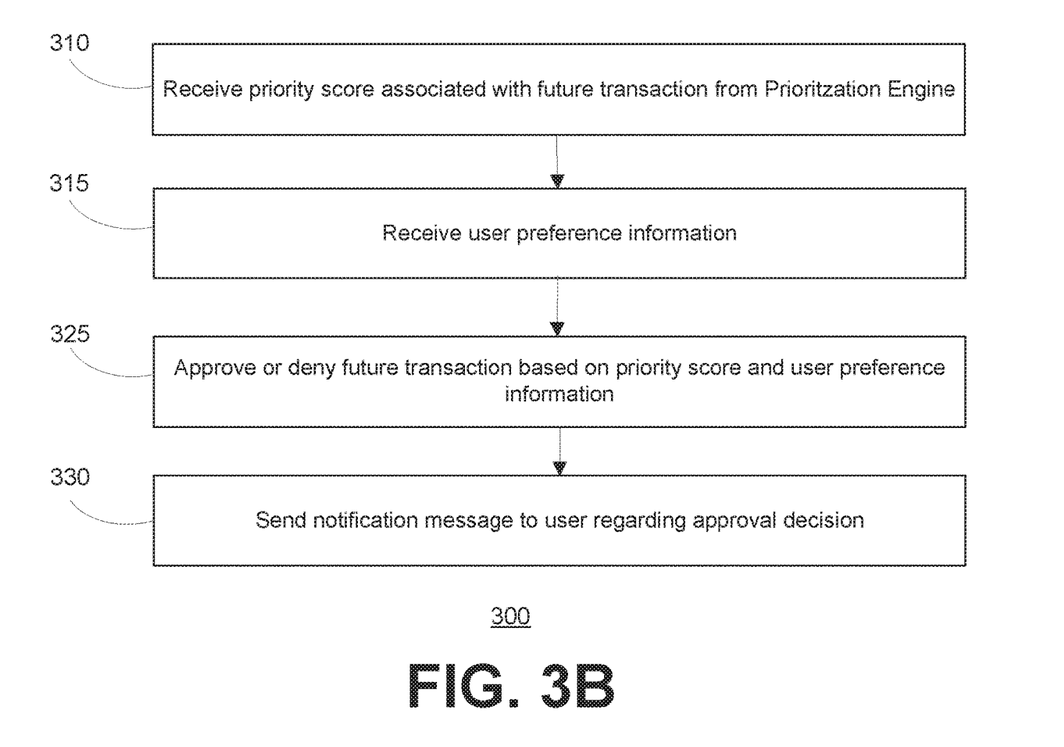

FIGS. 3A and 3B are flowcharts illustrating a method of transaction priority control according to one or more example embodiments, with reference to components and features described above including but not limited to the figures and associated description. Transaction priority control method 300 may be carried out by transaction approval engine 160.

At block 310, the future transaction and the priority score associated with the future transaction may be received from prioritization engine 140.

At block 320 (FIG. 3A), a determination whether to approve or deny the future transaction may be made, based on the priority score associated with the future transaction. In some examples, an approval determination may be made based on consideration of account balance, expected credits and debits, and the priority of the transaction(s) if there is going to be a lack of funds to cover all expected debits. If a transaction is approved the transaction may be added to the schedule of transactions to pay. If a transaction is denied, it the transaction may be deferred until more funds are added to the account and the user may be notified of the deferral. As previously noted, in some examples deferring a transaction may elevate the transaction's priority in future considerations.

As an example, an account may have three bills (e.g., a mortgage payment, a car payment, and an electric bill) due in the next month but only have funds to cover two of the bills. The bill that is not paid may be the electric bill because it was assigned a lower priority than the mortgage and car payment. The electric bill may be deferred for reconsideration at a later time (e.g., next month or when additional funds are available). When additional funds become available there may be two more bills under consideration as well as the electric bill, but the electric bill may be assigned a higher priority than it was assigned previously because it has already been deferred once.

At block 330, a notification message may be send to the user advising of the decision to approve or deny the future transaction. This notification may be sent to the user via any appropriate messaging technique, including e-mail, text message, push notification, etc.

In some embodiments, the sequence may follow blocks 310 through 330 as shown in FIG. 3B, which begins with block 310 and then proceeds as follows.

At block 310, the future transaction and the priority score associated with the future transaction may be received from prioritization engine 140 (same as described above).

At block 315, user preference information may be received from the user interface, or from another source.

At block 325, a determination whether to approve or deny the future transaction may be made based on the user preference information. In some embodiments, the determination whether to approve or deny the future transaction may be made based on the user preference information and on the priority score associated with the future transaction.

At block 330, a notification message may be send to the user advising of the decision to approve or deny the future transaction (same as described above). This notification may be sent to the user via any appropriate messaging technique, including e-mail, text message, push notification, etc.

In some embodiments, the transaction approval engine may request, via the user interface, user input in the form of a prioritization prior to denying the future transaction. For example, a user may decide that it is acceptable to incur an overdraft fee in order to pay a certain bill on time. This may be for a number of reasons, such as the user knows that additional funds will be available (e.g., cash on hand that will soon be deposited) in time prior to the actual withdrawal of funds from the account for the payment. Based on received user input, the transaction approval engine may approve or deny the future transaction.

In some embodiments, some or all of the features carried out by prioritization engine 140 and some or all of the features carried out by transaction approval engine 160 may be combined in and carried out by a single AI engine.

Figure 4:
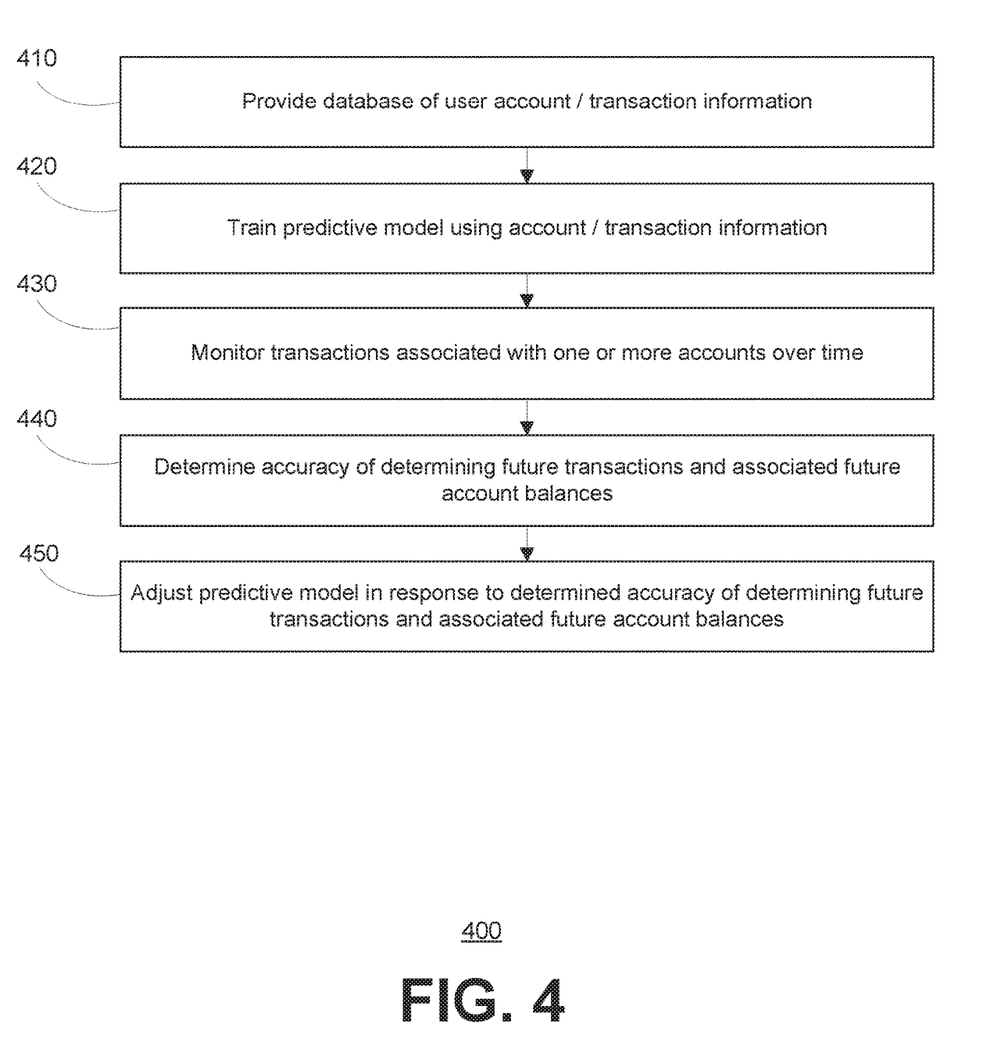
FIG. 4 provides a flowchart illustrating one or more methods relating to a predictive model in a transaction priority control system according to one or more example embodiments.

FIG. 4 provides a flowchart illustrating one or more methods relating to a predictive model in a transaction priority control system according to one or more example embodiments, with reference to components and features described above including but not limited to the figures and associated description. Transaction priority control method 400 may be carried out by prioritization engine 140 having access to user account information from account database 180.

At block 410, a database containing user and account information is provided. The information may include historical data associated with user transactions and accounts, and may include data associated with a plurality of users, or may be from a subset of users sharing a particular demographic (e.g., users sharing a particular range of income, or users who are high spenders). From this data, correlations, patterns and/or associations may be drawn between various users, transactions and account balances.

At block 420, the predictive model may be trained using the provided user and account information. Once the predictive model has been trained using the training data, the predictive model may be applied to user accounts to identify future transactions and associated future account balances.

At block 430, transactions and accounts for one or more user accounts may be monitored over time. By monitoring transactions and the respective user accounts, patterns of transactions and associated account balances may be developed over time.

At block 440, the prioritization engine may determine the accuracy of the results of the predictive model in determining future transactions and associated future account balances. For example, the predicted future transactions and associated future account balances may be compared with actual approved transactions and associated account balances. This comparison may be applied to numerous transactions and account balances for a single user, for many users, or for a category or sub-category of users (such as, e.g., users sharing a particular profession, or users having a particular range of income). Other examples of such user categories can include, without limitation, users with steady incomes, users with incomes from the gig economy (e.g., ridesharing drivers, contractors hired on a per-project basis), users with seasonally varying income, and users who earn fluctuating amounts of money based on commission, tips, or bonuses. By comparing predicted future transactions and associated future account balances with actual approved transactions and associated account balance, the accuracy of the predictive model may be determined.

At block 450, the prioritization engine may adjust the predictive model in response to the determined accuracy. By adjusting the predictive model as new or additional training data becomes available, some embodiments of the system may be continuously improved. In some embodiments, when the predictive model has been adjusted, as in block 450, the revised predictive model may be applied to operation of the prioritization engine (as described in FIGS. 2A and 2B). At that point a new future transactions and new associated future account balances may be determined and compared with actual approved transactions and account balances as they occur. This feedback loop may be used to develop a highly accurate predictive model over time.

In some examples, the present disclosure refers to a transaction involving a merchant, which may include, without limitation, retail merchants and vendors. However, it is understood that the present disclosure is not limited thereto, and that the present disclosure can include any type of merchant, vendor, or other entity involving in activities where products or services are sold or otherwise provided, either online, in a physical location, or both.

The description of embodiments in this disclosure provides non-limiting representative examples referencing figures and numerals to particularly describe features and teachings of different aspects of the disclosure. The embodiments described should be recognized as capable of implementation separately, or in combination, with other embodiments from the description of the embodiments. A person of ordinary skill in the art reviewing the description of embodiments should be able to learn and understand the different described aspects of the disclosure. The description of embodiments should facilitate understanding of the disclosure to such an extent that other implementations, not specifically covered but within the knowledge of a person of skill in the art having read the description of embodiments, would be understood to be consistent with an application of the disclosure Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A transaction priority control system, comprising:
at least one processor configured to:
generate a predictive model, wherein generating the predictive model comprises generating and training a hybrid neural network model combining both convolutional and recurrent neural networks, wherein the convolutional neural network analyzes spatial transaction patterns and the recurrent neural network analyzes temporal transaction sequences;
apply the predictive model to identify complex transaction patterns;
dynamically update weights of the predictive model based on new transaction data;
a prioritization engine; and
a transaction approval engine communicatively coupled to the prioritization engine,
wherein the prioritization engine is configured to apply the generated predictive model to:
select one or more predictor variables,
upon determining that an account balance of a user account is less than a first predetermined amount, apply the predictive model to identify one or more future debit transactions,
upon determining that a predicted future balance for a debt transaction of the one or more future debit transactions is less than a second predetermined amount, assign a priority score to the debit transaction, and
send the one or more future debit transactions and the priority score corresponding to the each of the one or more future debit transactions to the transaction approval engine, and
wherein the transaction approval engine is configured to:
receive the one or more future debit transactions including the priority score corresponding to the each of the one or more future debit transactions,
request, from a user device of the user, user preference information comprising user-specified transaction priorities for ranking different types of transactions and timing constraints specifying time periods during which the transaction priorities are effective for a future debit transaction of the one or more future debit transactions,
receive, from the user device, the user preference information of the user, and
approve or deny the future debit transaction based on the priority score and the user preference information,
wherein the priority score is calculated based on a combination of historical transaction patterns and real-time account conditions and wherein the approval or denial is determined by combining the calculated priority score with the user-specified transaction priorities and timing constraints.

2. The transaction priority control system of claim 1, wherein:
an account database stores transaction information and account data for a plurality of user accounts, wherein each of the plurality of user accounts comprises an account associated with a user, the transaction information includes one or more transactions associated with the account, a balance associated with the account, a first predetermined amount, and a second predetermined amount; and
a merchant database stores merchant information of a plurality of merchant accounts.

3. The transaction priority control system of claim 2, wherein the one or more predictor variables are selected based on data stored in the account database and in the merchant database, wherein the selected one or more predictor variables comprise a transaction type, a transaction amount, a transaction occurrence frequency and a merchant category code.

4. The transaction priority control system of claim 1, wherein:
the prioritization engine comprises the predictive model, and
the predictive model is trained with the selected predictor variables.

5. The transaction priority control system of claim 1, wherein the predictive model is applied to transaction information of a user account.

6. The transaction priority control system of claim 1, wherein the one or more future debit transactions are identified based on a transaction type, a transaction occurrence frequency and a merchant category code associated with each of a plurality of transactions.

7. The transaction priority control system of claim 1, wherein the transaction approval engine is configured to send a notification message to the user device about the approval or denial of the future debit transaction.

8. The transaction priority control system of claim 1, wherein the prioritization engine is configured to monitor the account balance associated with the user account.

9. The transaction priority control system of claim 1, wherein the prioritization engine is configured to compute the predicted future account balance associated with each of the one or more future transactions, wherein computing the predicted future account balance is based, in part, on adding a transaction amount associated with a credit transaction type to a current account balance and subtracting a transaction amount associated with a debit transaction type from the current account balance.

10. The transaction priority control system of claim 1, wherein the transaction approval engine is configured to transmit the one or more debit transactions flagged for denial based on a corresponding priority score, back to the prioritization engine, the prioritization engine being configured to increase a priority score associated with the one or more debit transactions received from the transaction approval engine during a subsequent predetermined time period.

11. A method performed by a transaction priority control system, comprising:
generating a predictive model, wherein generating the predictive model comprises generating and training a hybrid neural network model combining both convolutional and recurrent neural networks, wherein the convolutional neural network analyzes spatial transaction patterns and the recurrent neural network analyzes temporal transaction sequences;
    applying the predictive model to identify complex transaction patterns;
    dynamically updating weights of the predictive model based on new transaction data;
upon determining that an account balance of a user account is less than a first predetermined amount, applying the predictive model to identify one or more future debit transactions,
upon determining that a predicted future balance for a debt transaction of the one or more future debit transactions is less than a second predetermined amount, assigning a priority score to the debit transaction,
sending the one or more future debit transactions and the priority score corresponding to the each of the one or more future debit transactions,
receiving the one or more future debit transactions including the priority score corresponding to the each of the one or more future debit transactions,
requesting, from a user device of the user, user preference information comprising user-specified transaction priorities for ranking different types of transactions and timing constraints specifying time periods during which the transaction priorities are effective for a future debit transaction of the one or more future debit transactions,
receiving, from the user device, the user preference information of the user, and
approving or denying the future debit transaction based on the priority score and the user preference information,
wherein the priority score is calculated based on a combination of historical transaction patterns and real-time account conditions and wherein the approval or denial is determined by combining the calculated priority score with the user-specified transaction priorities and timing constraints.

12. The method of claim 11, further comprising sending a low balance notification to the user device upon determining that the future balance is less than the second predetermined amount.

13. The method of claim 11, wherein the predictive model is a supervised learning model for an identification of the one or more future transactions and a computation of the predicted future account balance.

14. The method of claim 13, wherein the supervised learning model is developed by machine learning using at least one of the following: gradient boosting, logistic regression, recurrent neural networks, convolutional neural networks, one-hot encoding, and learned embedding.

15. The method of claim 11, further comprising computing the future account balance associated with each of the one or more future transactions, wherein computing the future account balance is based, in part, on adding a transaction amount associated with a credit transaction type to a current account balance and subtracting a transaction amount associated with a debit transaction type from the current account balance.

16. A non-transitory computer-accessible medium having stored thereon computer-executable instructions for transaction priority control, wherein the computer-executable instructions that, when executed by a processor of a transaction priority control, cause the processor to perform procedures comprising:
    generating a predictive model, wherein generating the predictive model comprises generating and training a hybrid neural network model combining both convolutional and recurrent neural networks, wherein the convolutional neural network analyzes spatial transaction patterns and the recurrent neural network analyzes temporal transaction sequences;
    applying the predictive model to identify complex transaction patterns;
    dynamically updating weights of the predictive model based on new transaction data;
    upon determining that an account balance of a user account is less than a first predetermined amount, applying the predictive model to identify one or more future debit transactions;
    upon determining that a predicted future balance for a debt transaction of the one or more future debit transactions is less than a second predetermined amount, assigning a priority score to the debit transaction;
    sending the one or more future debit transactions and the priority score corresponding to the each of the one or more future debit transactions,
    receiving the one or more future debit transactions including the priority score corresponding to the each of the one or more future debit transactions,
    requesting, from a user device of the user, user preference information comprising user-specified transaction priorities for ranking different types of transactions and timing constraints specifying time periods during which the transaction priorities are effective for a future debit transaction of the one or more future debit transactions;
    receiving, from the user device, the user preference information of the user; and
    approving or denying the future debit transaction based on the priority score and the user preference information,
    wherein the priority score is calculated based on a combination of historical transaction patterns and real-time account conditions and wherein the approval or denial is determined by combining the calculated priority score with the user-specified transaction priorities and timing constraints.

17. The non-transitory computer-accessible medium of claim 16, wherein the procedure further comprises:
    increasing a priority score associated with the one or more debit transactions during a subsequent predetermined time period.

18. The non-transitory computer-accessible medium of claim 16, wherein the procedure further comprises:
    computing the future account balance associated with each of the one or more future transactions, wherein computing the future account balance is based, in part, on adding a transaction amount associated with a credit transaction type to a current account balance and subtracting a transaction amount associated with a debit transaction type from the current account balance.

* * * * *